J. NICOL.
CLAMP.
APPLICATION FILED AUG. 5, 1920.
1,375,312. Patented Apr. 19, 1921.
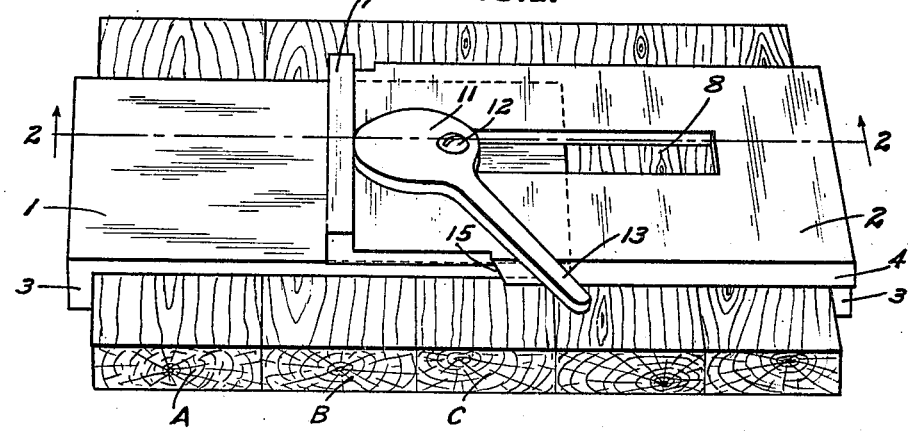
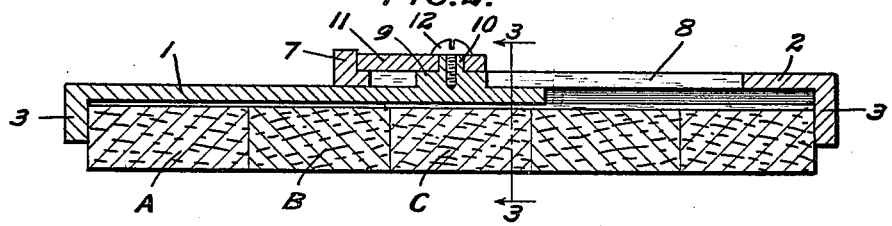
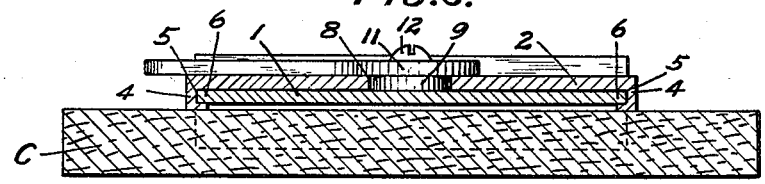
INVENTOR
JOHN NICOL
BY
ATTORNEYS.

UNITED STATES PATENT OFFICE.

JOHN NICOL, OF LOS ANGELES, CALIFORNIA.

CLAMP.

1,375,312.　　　　　Specification of Letters Patent.　　Patented Apr. 19, 1921.

Application filed August 5, 1920. Serial No. 401,509.

*To all whom it may concern:*

Be it known that I, JOHN NICOL, a citizen of the United States, residing at Los Angeles, in the county of Los Angeles and State of California, have invented new and useful Improvements in Clamps, of which the following is a specification.

This invention relates to clamps, and it is the object of the invention to provide a clamp which will be positive in its action and which is of extremely simple construction and operation.

The invention will be readily understood from the following description of the accompanying drawings, in which—

Figure 1 is a perspective view showing the clamp in use.

Fig. 2 is a longitudinal section on the line 2—2 of Fig. 1.

Fig. 3 is a transverse section on the line 3—3 of Fig. 2.

The clamp is shown employed for clamping together several strips of wood A, B, C, etc., although it will be obvious that the invention is applicable to general use where it is desired to employ a clamp.

The clamp includes members 1 and 2 longitudinally slidable relative to one another and having the angularly disposed engaging lips 3 at their respective outer ends. The side edges of one of the members, say the member 2, is provided with reversely bent portions 4 forming grooves 5 extending the length of said member. The member 1 is arranged to telescope relative to the member 2 with its side edges 6 received within grooves 5. The end of member 2 which overlies member 1 is provided with an angularly disposed lip 7 which forms an abutment adapted to be engaged by the actuating means for drawing the clamping members toward one another.

A longitudinal slot 8 is provided in clamping member 2, and the end of member 1 beneath clamping member 2 is provided with a lug 9 extending through said slot. This lug terminates in a bearing 10 upon which is journaled a cam 11. The cam may be retained in position by means of the screw 12. A handle 13 projects from the cam and the latter is so arranged that when it is turned upon its pivot the edge thereof will impinge against lip 7 so as to move clamping member 2 longitudinally relative to the clamping member 1. As a result the engaging lips 3 of the clamping members will be drawn toward one another and thereby form a positive clamp for the wooden strips A, B, C, etc.

In assembling the parts the lug 9 and bearing 10 are arranged to be inserted through slot 8 while positioning clamping member 1 with its side edges in grooves 5, by cutting away the portion of one of the reversely bent edges 4 which is adjacent the inner end of clamping member 2. This cut away portion of the reversely bent edge is shown at 15.

The construction as thus described provides for the ready assembling of the clamping members, and when thus assembled the clamping members form a positive clamp which is actuated by simply turning the cam lever 13.

Various changes may be made without departing from the spirit of the invention as claimed.

What is claimed is:

A clamp including engaging members, one of said members having grooved edges arranged to engage the edges of the other member for sliding movement of said members relative to one another, actuating means carried by one of said members for drawing said members toward one another, the member having grooved edges having one of said grooved edges partially cut away to permit of assembly of the parts.

In testimony whereof I have signed my name to this specification.

JOHN NICOL.